United States Patent
McWhorter

(10) Patent No.: US 7,288,335 B2
(45) Date of Patent: Oct. 30, 2007

(54) ALKALINE ELECTRODE TAPE

(76) Inventor: Edward Milton McWhorter, 6931 Greenbrook Cir., Citrus Heights, CA (US) 95621-6321

( * ) Notice: Subject to any disclaimer, the term of this patent is extended or adjusted under 35 U.S.C. 154(b) by 511 days.

(21) Appl. No.: 10/877,201

(22) Filed: Jun. 28, 2004

(65) Prior Publication Data
US 2005/0287417 A1   Dec. 29, 2005

(51) Int. Cl.
*H01M 4/00* (2006.01)
*H01M 8/18* (2006.01)
(52) U.S. Cl. .............. 429/40; 429/19; 429/27
(58) Field of Classification Search .......... 429/19, 429/27, 40
See application file for complete search history.

(56) References Cited

U.S. PATENT DOCUMENTS
2004/0118448 A1* 6/2004 Scher et al. ............. 136/252
* cited by examiner

*Primary Examiner*—Patrick Joseph Ryan
*Assistant Examiner*—Melissa B. Thompson

(57) ABSTRACT

The invention is a consumable Alkaline electrode for use in an Electrolytic Fuel Cell. The electrode system incorporates an intermediate perforated tape between the carrier insulation tape holding the electrolytic fuel and the cover stripper tape having a metalized surface which serves as the electrode conductor accepting electrons from the outer circuit. When the Electrolytic Fuel Cell tape feed mechanism introduces the electrode tape into the cathode electrolyte chamber the cover stripper tape is removed uncovering the perforations in the perforated tape underneath allowing the electrolyte to diffuse into the active metal complex generating protons and electrons. The use of a perforaied tape instead of a mechanical pin roller to bring the electrolyte into communication with the active metal simplifies the EFC cell design lowering manufacturing cost and weight.

3 Claims, 1 Drawing Sheet

ALKALINE ELECTRODE TAPE

CROSS REFERENCES

The present invention relates to my U.S. Pat. No. 6,653,007 and copending applications Ser. No. 10/392,608 filed Mar. 21, 2003 and Ser. No. 10/607,245 filed Jun. 27, 2003.

BACKGROUND OF THE INVENTION

In the previous electrode designs described in the cross-references, alkaline metals and alkaline earth metals are transferred to the surface of a carrier insulation tape and hermetically sealed with a metallized tape which also acts as the electrode conductor. The tape is then wound on cassette reels or folded in accordion fashion for placement in dispensing magazines. The cassettes or magazines are then inserted in an Electrolytic Fuel Cell, hereinafter referred to as the EFC cell. The EFC cell tape feed circuit passes the tape under a pin wheel roller operating in an aqueous electrolyte solution within the EFC cell cathode compartment. The pin wheel punctures the cover tape exposing the alkaline material to the electrolyte creating by their reaction an electrical current flow between the cathode and anode circuits of the EFC cell.

In the present invention a perforated tape is placed upon the alkaline material on the carrier insulation directly under, and in full contact with, the cover tape. Just prior to the introduction of the electrode into the electrolyte, or shortly thereafter, the cover stripper tape is stripped from the electrode allowing the electrolyte to react with the alkaline material through the perforations of the perforated tape. The cover tape is hereinafter called the cover stripper tape. The use of the cover stripper tape negates the need of a pin wheel perforating mechanism in operation of the EFC cell greatly simplifying the design.

In the cross references it has been found that the most efficient method of electric energy storage is by electrolytic reduction of alkali metal salts and alkaline earth metals which in their reduced state are called 'active metals'. The principle of Active Metal Electric Storage, called AMES storage, is based upon the first law of thermodynamics as it applies to the conservation of electron exchange occurring in the chemical reversibility of electrolysis and subsequent hydrolysis of the active metal yielding in the net energy release an electrochemical equivalent flow in the balanced transformation. The energy release in amp-hours per pound in the hydrolysis reaction, neglecting efficiency losses, is equal to the electrochemical equivalent weight of the electrode material undergoing hydrolysis in the cathode reaction chamber of the EFC cell.

SUMMARY OF THE INVENTION

The invention is a consumable cathode electrode for use in an Electrolytic Fuel Cell, hereinafter referred to as an EFC cell. The electrode is a tape material containing alkaline metals and alkaline earth metals placed on one surface and covered with a perforated tape, which in turn is covered by a metalized cover stripper tape. Before the electrode is passed through the electrolyte by the EFC cell tape feed mechanism the stripper tape is removed allowing the electrolyte to pass through the perforations of the perforated tape and come into contact with the alkaline material on the carrier tape where it reacts vigorously to form protons and electrons resulting in current flow between the cathode chamber and anode chamber of the EFC cell electrolyte fluid circuits.

It is the object of this invention to place a perforated tape on top of an active metal that is deposited on a carrier insulation and hermetically sealed by a metalized cover stripper tape which negates the need for mechanical pinwheel perforation during tape passage through the cathode electrolyte.

It is another object of the invention to design the metalized stripper tape such that it supports the entry of the electrode into the cathode electrolyte.

It is yet another object of the invention to construct the perforated tape with sufficient material thickness and material properties to withstand the vigorous thermal reaction during passage through the cathode electrolyte chamber holding the active metal in place.

DETAILED DESCRIPTION OF THE INVENTION

Figure 1:
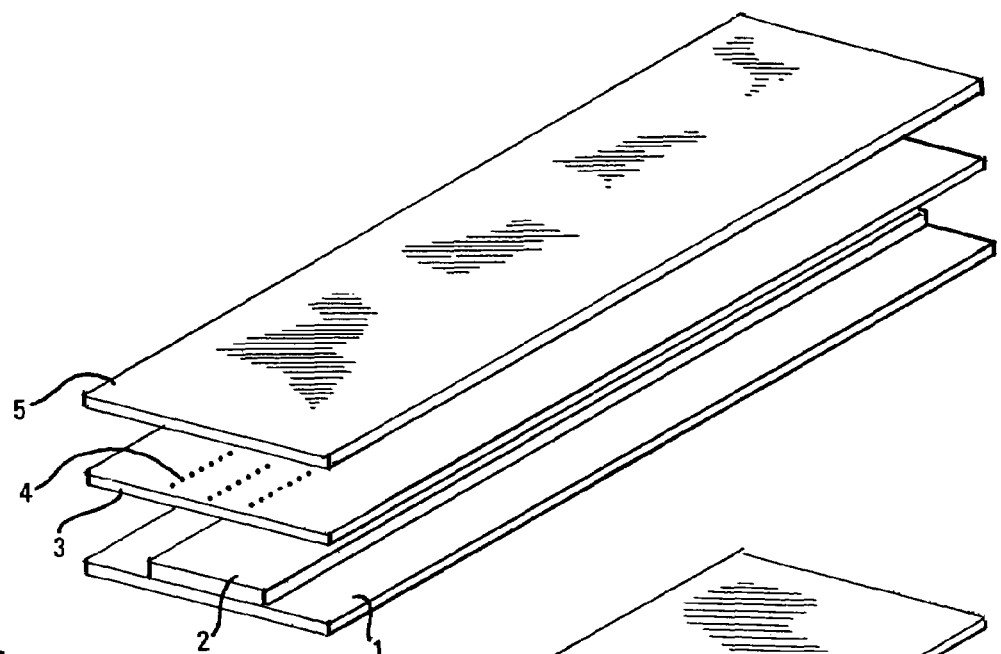
FIG. 1 Is a perspective drawing of the three tape components and active metal shown in exploded view prior to assembly.

The various individual elements comprising the electrode structure are shown in perspective exploded view in FIG. 1 of the drawings. In FIG. 1 the carrier insulation tape 1 holds the alkaline chemical reactive formulation, hereinafter called the active metal 2. The active metal 2 formulation, described in the cross-references, are comprised of Lithium, Sodium, Potassium, alkaline metals used as initiators and Magnesium and Calcium alkaline earth metals, used as moderators. The formulation of the active metal 2 is applied to the carrier insulation as a particular dispersion, by roller, or as powders, or flocculent mixtures, or by simple foil. For clarity, and ease of presentation, the active metal 2 of FIG. 1 is shown as a foil. Active metal 2 foil may run the total length of the carrier insulation or it may be applied in short segments to allow periodical lateral cross sealing. Perforated tape 3 having a plurality of small pin holes 4 that run longitudinally down its center above active metal 2.

Figure 2:
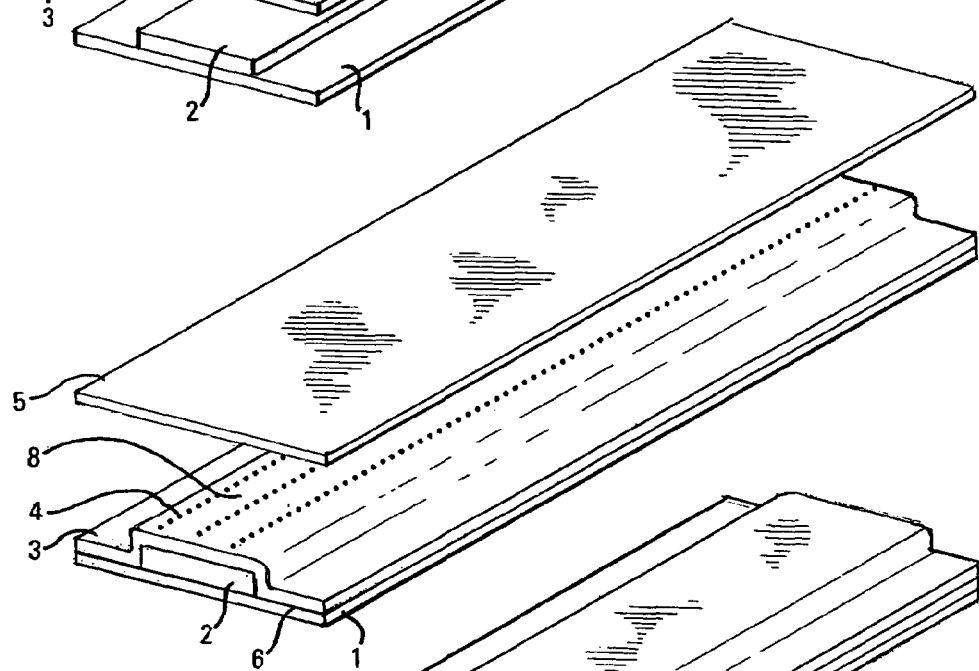
FIG. 2 Is a perspective view of the adhesive seal between the carrier tape holding the active metal and the perforated tape.

Turning now to FIG. 2 which is a perspective view of the partially assembled electrode showing the mounting of perforated tape 3 on the carrier insulation tape 1 with the pin holes 4 placed longitudinally over the active metal and in contact with the said active metal 2. In some electrode designs, depending on size and application, a water soluble compound 8 is placed over the pin holes 4 to momentarily defer beginning percolation and slow the diffusion rate into the active metal 2 medium. Carrier insulation tape 1 is adhesively sealed, or laser sealed, to perforated tape 3 at their interface hereinafter called seal 6. Seal 6 is a strong seal and will not release or come apart during the electrode operation or during the removal of cover stripper tape 5. Cover stripper tape 5 has a metalized surface.

Figure 3:
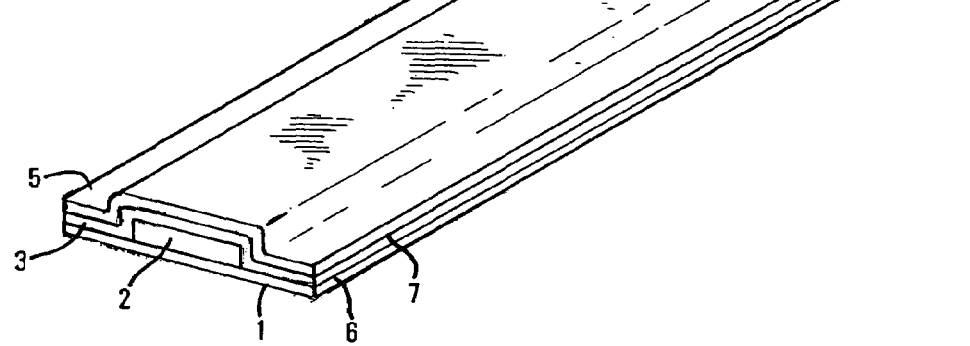
FIG. 3 Is a perspective view of the stripper tape placed upon the perforated tape and elastically sealed.

FIG. 3 is a perspective view of a segment of the assembled electrode. Cover stripper tape 5 is placed directly on top of perforated tape 3 and is elastically sealed at seal 7 at the interface of their edges. Seal 7 is a weak seal but capable of maintaining a hermetic environment within the electrode to prevent moisture or air from contacting the active metal 2. Seal 7 is sufficiently elastic to allow cover stripper tape 5 to be removed during EFC cell operation, exposing the active metal 2 to the electrolyte in the cathode electrolyte chamber.

NUMBERED ELEMENTS 1. carrier insulation tape
2. active metal
3. perforated tape
4. pinholes
5. cover stripper tape
6. seal
7. seal
8. compound

What is claimed is:

1. A cathode electrode comprising a carrier insulation tape, an active metal positioned at the center of said carrier insulation tape and running longitudinally with the said carrier insulation tape, a perforated tape placed on top of said carrier tape and said active metal and sealed at the interfacing edges of said carrier tape and said perforated tape, said perforated tape having pin holes, said pin holes being in communication with said active metal, a cover stripper tape placed on top of said perforated tape, said stripper tape and said perforated tape hermetically sealed together at their contacting edge interface.

2. The cathode electrode of claim 1 in which the said pin holes of said perforated tape are sealed with a water soluble compound.

3. The cathode electrode of claim 1 in which the said active metal is placed upon the said carrier insulation in segments.

* * * * *